United States Patent
Wang et al.

(10) Patent No.: US 7,802,136 B2
(45) Date of Patent: Sep. 21, 2010

(54) COMPILER TECHNIQUE FOR EFFICIENT REGISTER CHECKPOINTING TO SUPPORT TRANSACTION ROLL-BACK

(75) Inventors: Cheng Wang, Santa Clara, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 11/648,486

(22) Filed: Dec. 28, 2006

(65) Prior Publication Data

US 2008/0162990 A1    Jul. 3, 2008

(51) Int. Cl.
    *G06F 11/00* (2006.01)
(52) U.S. Cl. ......................................... 714/19
(58) Field of Classification Search .................. None
    See application file for complete search history.

(56) References Cited

U.S. PATENT DOCUMENTS

| | | | |
|---|---|---|---|
| 5,845,292 A * | 12/1998 | Bohannon et al. | 707/202 |
| 6,154,847 A * | 11/2000 | Schofield et al. | 714/4 |
| 6,526,499 B2 | 2/2003 | Palanca | |
| 7,349,927 B2 * | 3/2008 | Kanai et al. | 707/200 |
| 7,502,897 B2 | 3/2009 | Hertzberg | |
| 2006/0085588 A1 | 4/2006 | Rajwar | |
| 2006/0085591 A1 * | 4/2006 | Kumar et al. | 711/113 |
| 2006/0109979 A1 | 5/2006 | Afzal | |
| 2006/0161740 A1 | 7/2006 | Kottapalli | |
| 2007/0055960 A1 * | 3/2007 | Damron et al. | 717/131 |
| 2007/0136289 A1 | 6/2007 | Adl-Tabatabai | |
| 2007/0143287 A1 | 6/2007 | Adl-Tabatabai | |
| 2007/0143755 A1 | 6/2007 | Saha | |
| 2007/0156780 A1 | 7/2007 | Saha | |
| 2007/0156994 A1 | 7/2007 | Akkary | |
| 2007/0162520 A1 | 7/2007 | Petersen | |
| 2007/0186056 A1 | 8/2007 | Saha | |
| 2007/0233990 A1 | 10/2007 | Saha | |
| 2007/0260608 A1 | 11/2007 | Hertzberg | |
| 2007/0300238 A1 | 12/2007 | Kontothanassis | |
| 2008/0005504 A1 | 1/2008 | Barnes | |
| 2008/0021934 A1 | 1/2008 | Hudson | |
| 2008/0065864 A1 | 3/2008 | Akkary | |

OTHER PUBLICATIONS

Ananian, C.S.; Asanovic, K.; Kuszmaul, B.C.; Leiserson, C.E.; Lie, S.; "Unbounded transactional memory", 11th International Symposium on High-Performance Computer Architecture, 2005. HPCA-11, Feb. 12-16, 2005 pp. 316-327.

(Continued)

*Primary Examiner*—Michael C Maskulinski
(74) *Attorney, Agent, or Firm*—Barnes & Thornburg, LLP

(57) ABSTRACT

A method and apparatus for efficient register checkpointing is herein described. A transaction is detected in program code. A recovery block is inserted in the program code to perform recovery operations in response to an abort of the first transaction. A roll-back edge is potentially inserted from an abort point to the recovery block. A control flow edge is inserted from the recovery block to a entry point of the transaction. Checkpoint code is inserted before the entry point to backup live-in registers in backup storage elements and recovery code is inserted in the recovery block to restore the live-in registers from the backup storage elements in response to an abort of the transaction.

17 Claims, 8 Drawing Sheets

OTHER PUBLICATIONS

Ravi Rajwar, Maurice Herlihy, and Konrad Lai. "Virtualizing Transactional Memory." In Proc. of the 32nd Annual Intl. Symp. On Computer Architecture, Jun. 2005.

Kevin E. Moore, Jayaram Bobba, Michelle J. Moravan, Mark D. Hill & David A. Wood, "LogTM: Log-based Transactional Memory," HPCA 2006.

M. Herlihy, V. Luchango, M. Moir and W.N. Scherer, "Software Transactional Memory for Dynamic Sized Data Structures", PODC 2003.

K, Fraser and T. Harris. Concurrent Programming without Locks.

T. Harris and S. Marlow, S.P. Jones, and M. Herlihy. Composable Memory Transactions. In Proceedings of the Tenth ACM Symposium on Principles and Practice of Parallel Programming, 2005.

V. J. Marathe, W. N. Scherer III, and M. L. Scott. Adaptive Software Transactional Memory. In Proceedings of the Nineteenth International Symposium on Distributed Computing, 2005.

Timothy Harris, MarkPlesko, Avraham Shinnar and David Tarditi, Optimizing Memory Transactions. In Proceeding of Conference on Programming Language Design and Implementation, 2006.

H. Berenson, P. Bernstein, J. Gray, J. Melton, E. O'Neil, and P. O'Neil. "A critique of ANSI SQL isolation levels". In Proceedings of SIGMOD, pp. 1-10, 1995.

Torval Riegel, Christof Fetzer, and Pascal Felber, "Snapshot Isolation for Software Transactional Memory," TRANSACT'06.

"Implementing a High Performance Software Transactional Memory for a Multi-core Runtime" by Bratin Saha, Ali-Reza Adl-Tabatabai, Rick Hudson, Chi Cao Minh, and Ben Hertzberg, Proceedings of the eleventh ACM SIGPLAN symposium on Principles and practice of parallel programming, 2006.

"Software Transactional Memory" by N. Shavit and D. Tuitou, Proceedings of the Fourteenth ACM SIGACT-SIGOPS Symposium on Principles of Distributed Computing.

"Language Support for Lightweight Transactions", by T.L. Harris and K. Fraser, Proceedings of the 2003 ACM SIGPLAN Conference on Object-Oriented Programming Systems.

Languages and Applications; and "Compiler and runtime support for efficient software transactional memory," by Ali-Reza Adl-Tabatabai, Brian Lewis, Vijay Menon, Brian Murphy, Bratin Saha, and Tatiana Shpeisman. Proceedings of the 2006 ACM SIGPLAN conference on Programming language design and implementation.

* cited by examiner

COMPILER TECHNIQUE FOR EFFICIENT REGISTER CHECKPOINTING TO SUPPORT TRANSACTION ROLL-BACK

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple threads present on individual integrated circuits. A processor or integrated circuit typically comprises a single processor die, where the processor die may include any number of cores or threads, which are often viewed from the perspective of software as logical processors. A core or thread is may also be referred to as a resource, such as a processing resource.

The ever increasing number of resources on integrated circuits enables more software threads to be executed simultaneously. However, the increase in the number of software threads that may be executed concurrently have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hash table.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, one of the transactions may be aborted to resolve the conflict.

However, when a transaction is aborted and an initial state of registers and locations updated in the transaction is restored. Often this is referred to as roll-back. Typically during a transaction every update is logged so that locations may be rolled-back in response to an abort. Yet, logging every update is potentially inefficient for register state.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware support for transactional execution, specific tracking/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific multi-core and multi-threaded processor architectures, interrupt generation/handling, cache organizations, and specific operational details of microprocessors, have not been described in detail in order to avoid unnecessarily obscuring the present invention.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and, 0 refers to a low logic level. However, other representations of values in computer systems have been used. For example the decimal number 10 may also be as a binary value of 1010 and a hexadecimal letter A.

Moreover, states may be represented by values or portions of values. As an example, a locked state may be represented by a first value in a location, such as an odd number, while a version number, such as an even value, in the location represents an unlocked state. Here, a portion of the first and second value may be used to represent the states, such as two lower bits of the values, a sign bit associated with the values, or other portion of the values.

The method and apparatus described herein are for efficient checkpointing of storage locations to support transaction roll-back. Specifically, efficient checkpointing of storage locations to support transaction roll-back is primarily discussed in reference to multi-core processor computer systems. However, the methods and apparatus for efficient checkpointing of storage locations to support transaction roll-back are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads, that utilize transactional memory.

Figure 1:
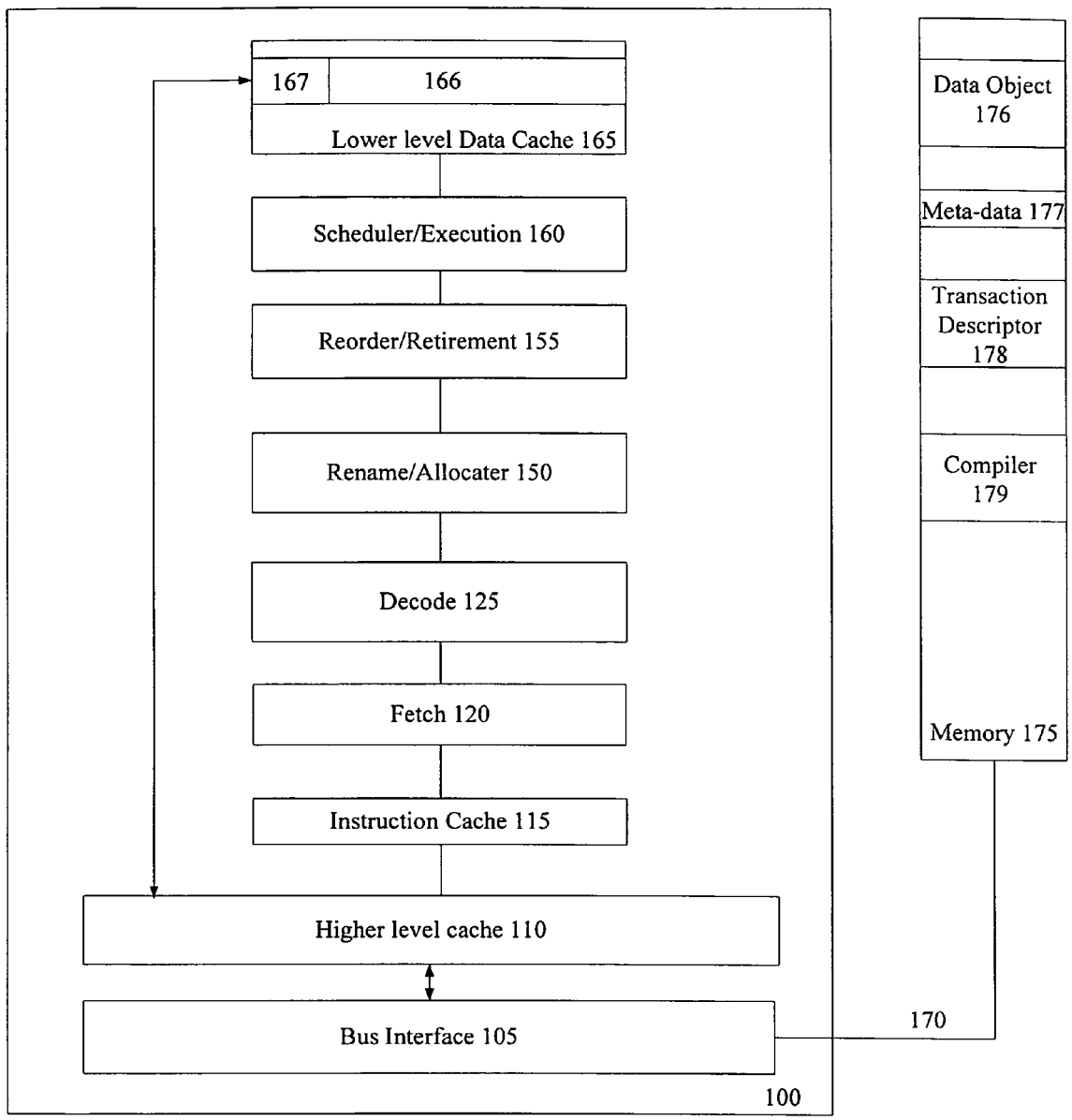
FIG. 1 illustrates an embodiment of a system including a processor and a memory capable of transactional execution.

Referring to FIG. 1, an embodiment of a processor capable of efficient checkpointing of storage locations to support transaction roll-back is illustrated. In one embodiment, processor 100 is a multi-core processor capable of executing multiple threads in parallel. However processor 100 may include any processing element, such as an embedded processor, cell-processor, microprocessor, or other known processor, which is capable of executing one thread or multiple threads. As an illustrative example, a simplified embodiment of an out-of-order architecture for a processor is illustrated in FIG. 1.

The modules shown in processor 100, which are discussed in more detail below, are potentially implemented in hardware, software, firmware, or a combination thereof. Note that the illustrated modules are logical blocks, which may physically overlap the boundaries of other modules, and may be configured or interconnected in any manner. In addition, the modules as shown in FIG. 1 are not required in processor 100. Furthermore, other modules, units, and known processor features may also be included in processor 100.

Bus interface module 105 is to communicate with a device, such as system memory 175, a chipset, a north bridge, or other integrated circuit. Typically bus interface module 105 includes input/output (I/O) buffers to transmit and receive bus signals on interconnect 170. Examples of interconnect 170 include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol.

Processor 100 is coupled to memory 175, which may be dedicated to processor 100 or shared with other devices in a system. Examples of memory 175 includes dynamic random access memory (DRAM), static RAM (SRAM), non-volatile memory (NV memory), and long-term storage. Bus interface unit 105 as shown is also to communicate with higher level cache 110.

Higher-level cache 110 is to cache recently fetched and/or operated on elements. In one embodiment, higher-level cache 110 is a second-level data cache. However, higher level cache 110 is not so limited, as it may be or include instruction cache 115 to store recently fetched/decoded instructions. Instruction cache 115, which may also be referred to as a trace cache, is illustrated before fetch logic 120 and decode logic 125. Here, instruction cache 115 stores recently fetched instructions that have not been decoded. Yet, instruction cache 115 is potentially placed after fetch logic 120 and/or after decode logic 125 to store decoded instructions.

Fetch logic 120 is to fetch data/instructions to be operated on/executed. Although not shown, in one embodiment, fetch logic includes or is associated with branch prediction logic, a branch target buffer, and/or a prefetcher to predict branches to be executed/taken and pre-fetch instructions along a predicted branch for execution. Here, a processor capable of speculative execution potentially prefetches and speculatively executes predicted branches. Decode logic 125 is coupled to fetch logic 120 to decode fetched elements.

Allocator and renamer module 150 includes an allocator to reserve resources, such as register files to store instruction processing results and a reorder buffer to track instructions. Unit 130 may also include a register renamer to rename program/instruction reference registers to other registers internal to processor 100. Reorder/retirement module 125 includes components, such as the reorder buffers mentioned above, to support out-of-order execution and later retirement of instructions executed out-of-order. In one embodiment, where processor 100 is an in-order execution processor, re-order/retirement module 155 may not be included.

Scheduler and execution module 120, in one embodiment, includes a scheduler unit to schedule instructions/operations on execution units. Register files associated with execution units are also included to store information instruction processing results. Exemplary execution units include a floating point execution unit, an integer execution unit, a jump execution unit, a load execution unit, a store execution unit, and other known execution units.

Also shown in FIG. 1 is lower level data cache 165. Data cache 165 is to store recently used/operated on elements, such as data operands. In one embodiment, a data translation lookaside buffer (DTLB) is associated with lower level data cache 165. Often a processor logically views physical memory as a virtual memory space. As a specific example, a processor may include a page table structure to break physical memory into a plurality of virtual pages. Here, a DTLB supports translation of virtual to linear/physical addresses. Data cache 165 may be utilized as a transactional memory or other memory to track tentative accessed during execution of a transaction, as discussed in more detail below.

In one embodiment, processor 100 is a multi-core processor. A core often refers to any logic located on an integrated circuit capable of maintaining an independent architectural state, wherein each independently maintained architectural state is associated with at least some dedicated execution resources. In one embodiment, execution resources, such as execution module 160, include physically separate execution units dedicated to each core. However, execution module 160 may include execution units that are physically arranged as part of the same unit or in close proximity; yet, portions of execution module 160 are logically dedicated to each core. Furthermore, each core may share access to processor resources, such as higher level cache 110.

In another embodiment, processor 100 includes a plurality of hardware threads. A hardware thread typically refers to any logic located on an integrated circuit capable of maintaining an independent architectural state, wherein the independently maintained architectural states share access to some execution resources. For example, smaller resources, such as instruction pointers, renaming logic in rename allocator logic 150, an instruction translation buffer (ILTB) may be replicated for each hardware thread, while, resources, such as re-order buffers in reorder/retirement unit 155, load/store buffers, and queues may be shared by hardware threads through partitioning. Other resources, such as low-level data-cache and data-TLB 165, execution unit(s) 160, and parts of out-of-order unit 155 are potentially fully shared.

As can be seen, as certain processing resources are shared and others are dedicated to an architectural state, the line between the nomenclature of a hardware thread and core overlaps. Yet often, a core and a hardware thread are viewed by an operating system as individual logical processors, with each logical processor being capable of executing a thread. Logical processors may also be referred to herein as resources or processing resources. Therefore, a processor, such as processor 100, is capable of executing multiple threads on multiple logical processors/resources. Consequently, multiple transactions may be simultaneously and/or concurrently executed in processor 100.

A transaction includes a grouping of instructions, operations, or micro-operations, which may be grouped by hardware, software, firmware, or a combination thereof. For example, instructions may be used to demarcate a transaction. Typically, during execution of a transaction, updates to memory are not made globally visible until the transaction is committed. While the transaction is still pending, locations loaded from and written to within a memory are tracked.

Upon successful validation of those memory locations, the transaction is committed and updates made during the transaction are made globally visible. However, if the transaction is invalidated during its pendency, the transaction is restarted without making the updates globally visible. As a result, pendency of a transaction, as used herein, refers to a transaction that has begun execution and has not been committed or aborted, i.e. pending. Two example systems for transactional execution include a Hardware Transactional Memory (HTM) system and a Software Transactional Memory (STM) system.

A Hardware Transactional Memory (HTM) system often refers to tracking access during execution of a transaction with processor 100 in hardware. For example, a cache line 166 is to cache data item/object 176 in system memory 175. During execution of a transaction, annotation/attribute field 167, which is associated with cache line 166 is utilized to track accesses to and from line 166. For example, attribute field 167 includes a transaction read bit to track if cache line 166 has been read during execution of a transaction and a transaction write bit to track if cache line 166 has been written to during execution of the transaction.

Attribute field 167 is potentially used to track accesses and detect conflicts during execution of a transaction, as well as upon attempting to commit the transaction. For example, if a transaction read bit in field 167 is set to indicate a read from line 166 occurred during execution of a transaction and a store associated with line 166 from another transaction occurs, a conflict is detected. Examples of utilizing an attribute/annotation field for transactional execution is included in co-pending application with Ser. No. 11/027,623 entitled, "Transaction based shared data operations in a Multiprocessor Environment."

A Software Transactional Memory (STM) system often refers to performing access tracking, conflict resolution, or other transactional memory tasks in software. As a general example, compiler 179 in system memory 175, when executed by processor 100, compiles program code to insert read and write barriers into load and store operations, accordingly, which are part of transactions within the program code. Compiler 179 may also insert other transaction related operations, such as commit, abort, recovery, backup, roll-back edge, and control flow edge operations, as discussed in more detail below in reference to FIGS. 3-8.

As shown, cache 165 is still to cache data object 176, as well as meta-data 177 and transaction descriptor 178. However, meta-data location 177 is associated with data item 176 to indicate if data item 176 is locked. A read log, which may be present in transaction descriptor 178, is used to log read operations, while a write buffer or other transactional memory, which may include lower-level data cache 165, is used to buffer or log write operations. Inserted calls for validation and commit utilize the logs to detect conflicts and validate transaction operations.

Figure 2:
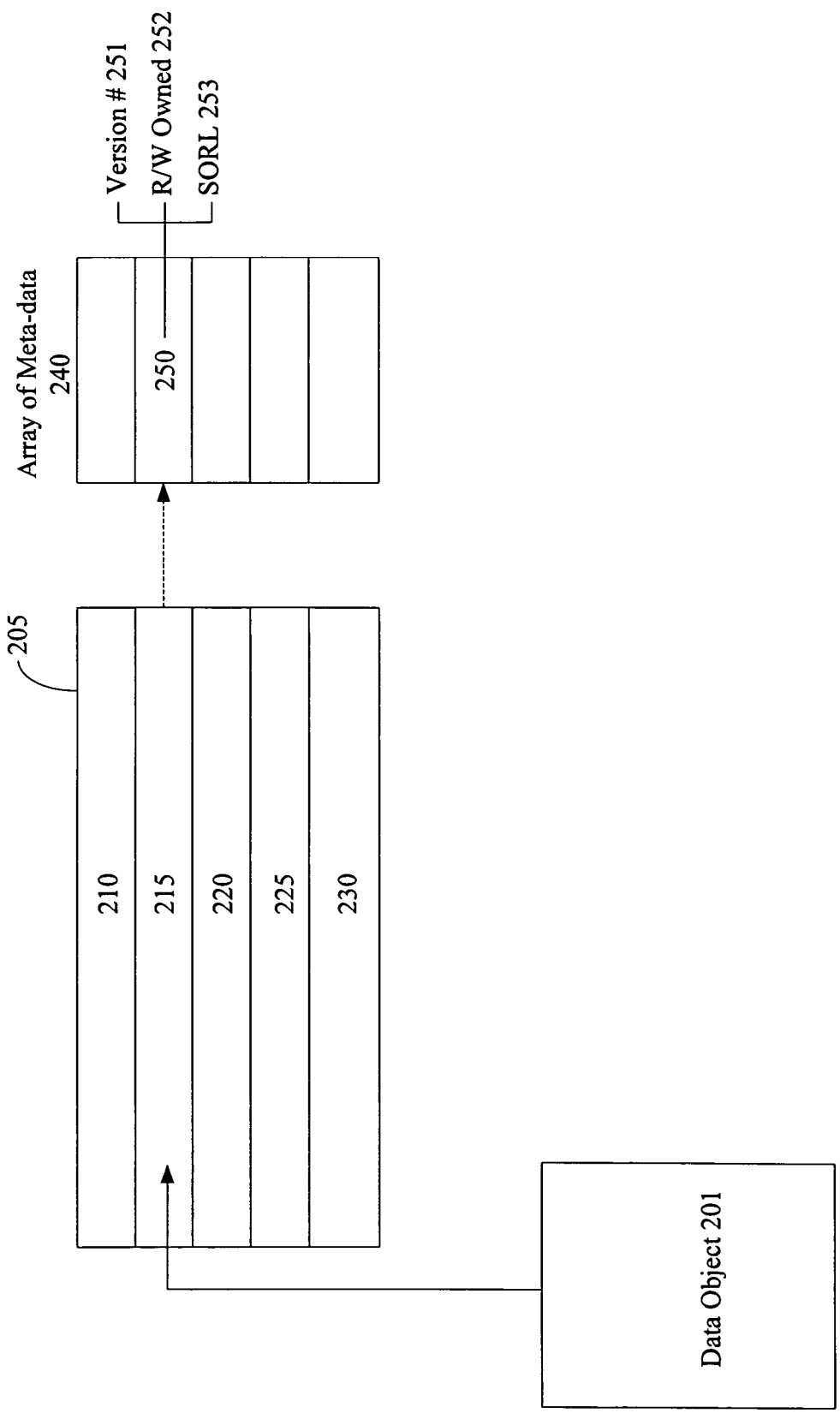
FIG. 2 illustrates an embodiment of a Software Transactional Memory (STM) system.

Referring to FIG. 2, an embodiment of a Software Transactional Memory (STM) system is illustrated. Data object 201 includes any granularity of data, such as a bit, a word, a line of memory, a cache line, a table, a hash table, or any other known data structure or object. For example, a programming language defined data object is data object 201. Transactional memory 205 includes any memory to store elements associated with transactions. Here, transactional memory 205 comprises plurality of lines 210, 215, 220, 225, and 230. In one embodiment, memory 205 is a cache memory. As an example, data object 201 is to be stored aligned in cache line 215. Alternatively, data object 201 is capable of being stored unaligned in memory 205.

In one example, each data object is associated with a meta-data location in array of meta-data 240. As an illustrative embodiment, an address associated with cache line 215 is hashed to index array 240, which associates meta-data location 250 with cache line 215 and data object 201. Note that data object 201 may be the same size of, smaller than (multiple elements per line of cache), or larger than (one element per multiple lines of cache) cache line 215. In addition, meta-data location 250 may be associated with data object 201 and/or cache line 215 in any manner.

Usually, meta-data location 250 represents whether data object 201 is locked or available. In one embodiment, when data object 201 is locked, meta data location 250 includes a first value to represent a locked state, such as read/write owned state 252. As an example, the first value includes a reference, such as a pointer, to a transaction descriptor. A transaction descriptor is often to store information related with the transaction, such as transaction ID, a resource structure, or other information associated with a transaction. In one embodiment, a read log and/or write log is included in the transaction descriptor.

Another exemplary lock state, which meta-data 250 may represent, is Single Owner Read Lock (SORL) state 253, which is discussed in more detail in co-pending related application entitled, "A mechanism for Irrevocable Transactions," with Ser. No. 11/648,485. Yet, any lock or lock state may be utilized and represented in meta-data location 250.

Typically, when unlocked, or available, meta-data location 250 includes a second value. In one embodiment, the second value is to represent version number 251. Here, version number 251 is updated, such as incremented, upon a write to data object 201, to track a current version of data object 201. Versioning allows transactions to validate their operations by ensuring the data objects utilized in the transaction have not been modified, as represented by a modified version number.

The example above includes one embodiment of implementing an STM; however, any known implementation of an STM may be used. STMs are discussed in the following articles: "Implementing a High Performance Software Transactional Memory for a Multi-core Runtime" by Bratin Saha, Ali-Reza Adl-Tabatabai, Rick Hudson, Chi Cao Minh, and Ben Hertzberg, *Proceedings of the eleventh ACM SIGPLAN symposium on Principles and practice of parallel programming;* "Software Transactional Memory" by N. Shavit and D. Tuitou, *Proceedings of the Fourteenth ACM SIGACT-SIGOPS Symposium on Principles of Distributed Computing*; "Language Support for Lightweight Transactions", by T. L. Harris and K. Fraser, *Proceedings of the 2003 ACM SIGPLAN Conference on Object-Oriented Programming Systems, Languages and Applications;* and "Compiler and runtime support for efficient software transactional memory," by Ali-Reza Adl-Tabatabai, Brian Lewis, Vijay Menon, Brian Murphy, Bratin Saha, and Tatiana Shpeisman. *Proceedings of the 2006 ACM SIGPLAN conference on Programming language design and implementation."*

In fact, any known system for performing transactional memory may also be used, such as an HTM, an STM, an Unbounded Transactional Memory (UTM) system, a restricted transaction memory (RTM) system, a hybrid Transactional Memory system, such as a hardware accelerated/assisted STM (HASTM), or any other transactional memory system. Co-pending and related application entitled, "Hardware Acceleration of a write-buffering software transactional memory," with Ser. No. 11/784,859 discusses hardware acceleration of an STM. Co-pending application entitled, "Overflow Method for Virtualized Transactional Memory," with Ser. No. 11/479,902 discusses extending/virtualizing an HTM.

With any of the aforementioned transactional memory systems, during speculative execution of a transaction a data conflict potentially occurs leading to an abort of the transaction. In response to an abort, any speculatively updated memory locations are restored to their original value before the transaction started, which is often referred to as "transaction roll-back."

Figure 3:
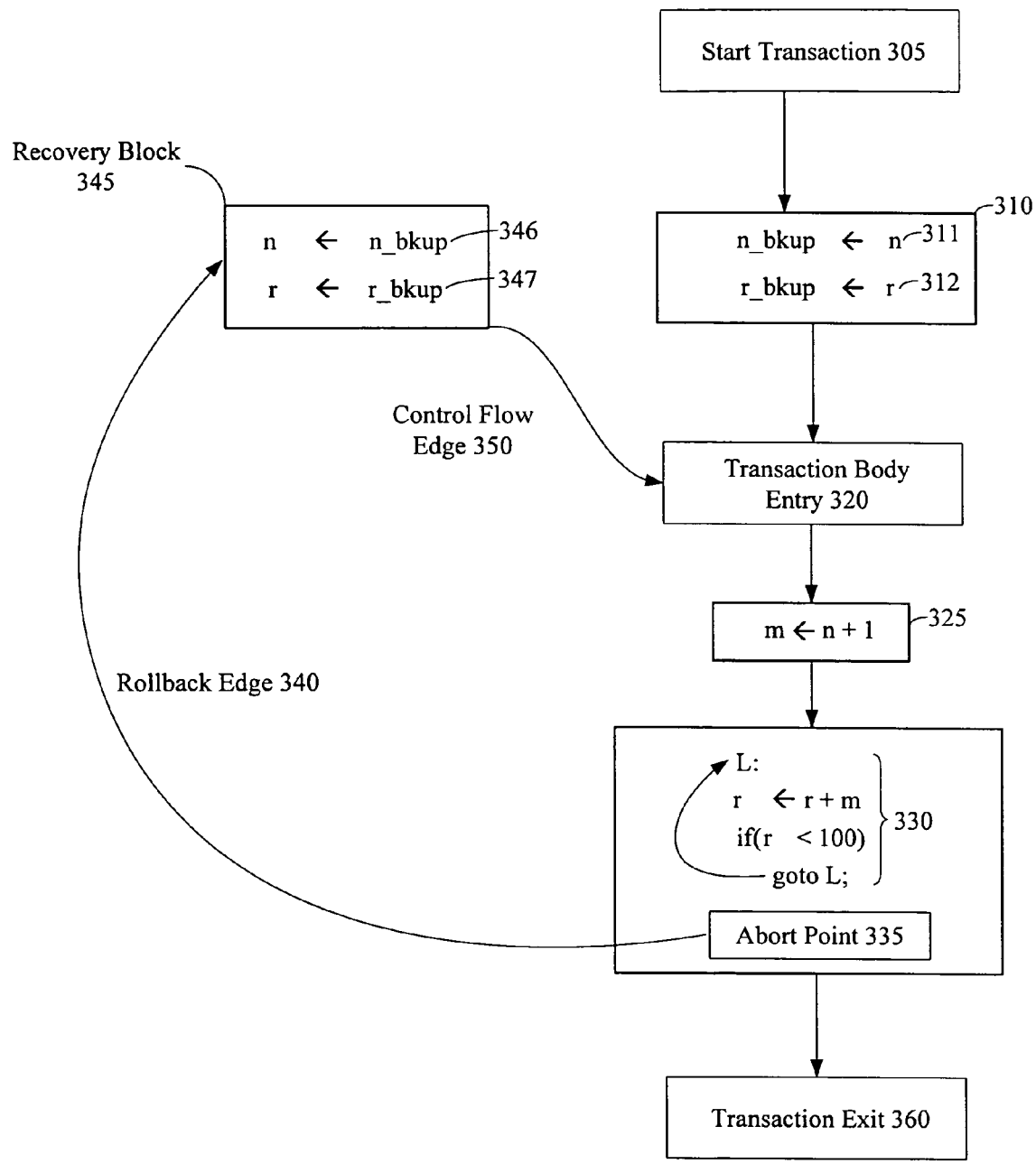
FIG. 3 illustrates an embodiment of a transaction region with inserted operations to perform efficient storage element checkpointing.

Turning to FIG. 3, an embodiment of a control flow diagram for a transaction region is illustrated. As stated above in reference to FIG. 1, a compiler, when executed to compile program code, may insert operations into the program code and perform optimizations of the program code. Therefore, in one embodiment, inserting instructions or performing optimizations is done during compilation of program code. Note that instructions/operations may be inserted before or after compiler optimizations are performed. In addition, the inserted operations and performed optimizations, when executed by a processing element, potentially determine the execution flow of program code, as well as modify a processing element's execution of the program code.

When compiling code, the compiler is capable of detecting transactions. For example, a first transaction is detected when a start transaction instruction at start transaction point 305 is encountered. Often a start transaction instruction and a corresponding end transaction instruction are used to demarcate a transaction or transaction region, such as the transaction region demarcated by start transaction point 305 and end transaction point 360. However, other instructions or demarcating operations may define a transactional region of code.

Storage elements updated and/or utilized during execution of the transaction may need to be backed-up, i.e. checkpointed, to ensure original register states are capable of being restored upon an abort of the transaction. Therefore, a storage element to be utilized in execution of the transaction is determined to be checkpointed. In one embodiment, the storage element is to be checkpointed if the storage element is modified in the transaction. In another embodiment, the storage element is to be checkpointed if the storage element is a live-in storage element. As a combination of the two, a register may be determined to be checkpointed, if it is both a live-in register that is modified in the transaction.

Often a live-in storage element refers to a storage element, which stores, holds, or includes data outside the transaction, which is to be utilized in the transaction. Therefore, from the perspective of a transactional region, a live-in storage element may also be referred to as a storage element "coming in" to the transaction. For example, in FIG. 3, live-in registers n and r are determined to be backed up.

Note that live-in storage elements may be determined/computed at any time during compilation or optimization. In one embodiment, checkpointing operations, such as operations 310 and 315 are inserted before compiler optimizations. Here, the transaction region, checkpoint instructions 310 and 315, and roll-back/recover instructions 311 and 312 are all able to benefit from compiler optimizations.

A storage element refers to any element to store data. Examples of a storage element include a register, a hardware register, an abstract register, a virtual register, a memory location, and a memory location in a program stack associated with the first transaction. As discussed above in reference to FIG. 1, a processor is potentially capable of renaming language referenced virtual registers to registers internal to the processor.

In FIG. 3, operation 311 and 312 are inserted at a transaction entry point 320 to store an original value of registers n and r in virtual registers n_bkup and r_bkup, respectively. Note that the use of insertion "at" a point in a transaction region potentially refers to a specific point within the transaction, as well as to before or after a referenced point. For example, many transaction regions include a critical section of atomic operations to be performed, such as operations 325 and 330. Yet, a compiler often inserts start transaction instructions/operations to initialize resources, variables, etc. for execution within the critical section, as well as inserts read barrier and write barrier calls/operations within the critical section. Therefore, transaction body entry point 320 is also referred to as a critical section entry point 320.

Here, checkpoint operations 311 and 312 are inserted at or before critical section entry point 320 to backup live-in registers n and r. In one embodiment, operations 311 and 312 include a copy or store operation to store the original contents of locations n and r in n_bkup and r_bkup, respectively. Often the grouping of operations 311 and 312, as well as other inserted storage element backup operations is referred to as checkpoint block of code 310, or just checkpoint 310.

In addition to checkpoint block of code 310, recovery block 345 is also inserted to perform recovery operations in response to a rollback of the transaction. Here, operations 346 and 347 are to restore the original values stored in n_bkup and r_bkup to registers n and r, respectively, in response to an abort event. Recover block of code 345 may also be referred to as a recovery point. Similar to operations 311 and 312, operations 346 and 347 include copy or store instructions to store the contents of n_bkup and r_bkup in registers n and r before re-executing the transaction.

In addition, rollback edge 340 is inserted at abort point 335 to direct a program flow in the transaction region to the recovery block in response to an abort event. An abort event includes any event leading to an abort of the transaction. For example, an abort event includes encountering an invalid read/load in the transaction, a data conflict, an irrevocable operation, a function call, or other known event that potentially causes an abort of a transaction. In the examples above, a function call is included as an abort event, as an abort of the transaction may occur within a callee function; therefore, in one example, all function calls are determined to be potential abort points. In one embodiment, rollback edge 340 is inserted at all possible abort points in the transaction region.

To illustrate, at the end of a transaction, often in response to encountering a commit instruction, a read set of the transaction region is validated using version values, as discussed above. If the read set is valid then the transaction commits accordingly, but if the read set is not valid the transaction aborts. Here, a pseudo code representation of this action include: if(read_set==valid) {commit}; else abort;. Rollback edge 340 may be inserted to form the following pseudo code illustrative embodiment: if(read_set==valid) {commit}; else goto recovery block 345;. Therefore, the insertion of a control flow operation referencing recover block 345 creates rollback edge 340 from abort point 335 to recover block 345.

Typically, when a transaction aborts, the transaction is retried. Therefore, another control flow operation is inserted at recovery point 345, which is potentially after recovery operations 346 and 347, to direct the program flow from recover block 345 to transaction entry point 320. Here, insertion of this flow control operation is referred to as inserting control flow edge 350. In one example, control flow edge 350 potentially directs flow to checkpoint 310. However, as n_bkup and r_bkup already contain the original contents of registers n and r, there is no need to re-execute checkpoint instruction 311 and 312. Therefore, control flow edge is directed to the critical section entry point to re-execute the transaction.

In one embodiment, due to the insertion of roll-back edge 340 and recovery edge 350, a compiler is aware that n_bkup and r_bkup are potential inputs during execution of the transaction. As a result, the compiler ensures that backup registers, n_bkup and r_bkup, are not overwritten until the transaction is committed. In other words, the compiler is biased against re-using registers n_bkup and r_bkup in response to rollback edge 340.

Figure 4:
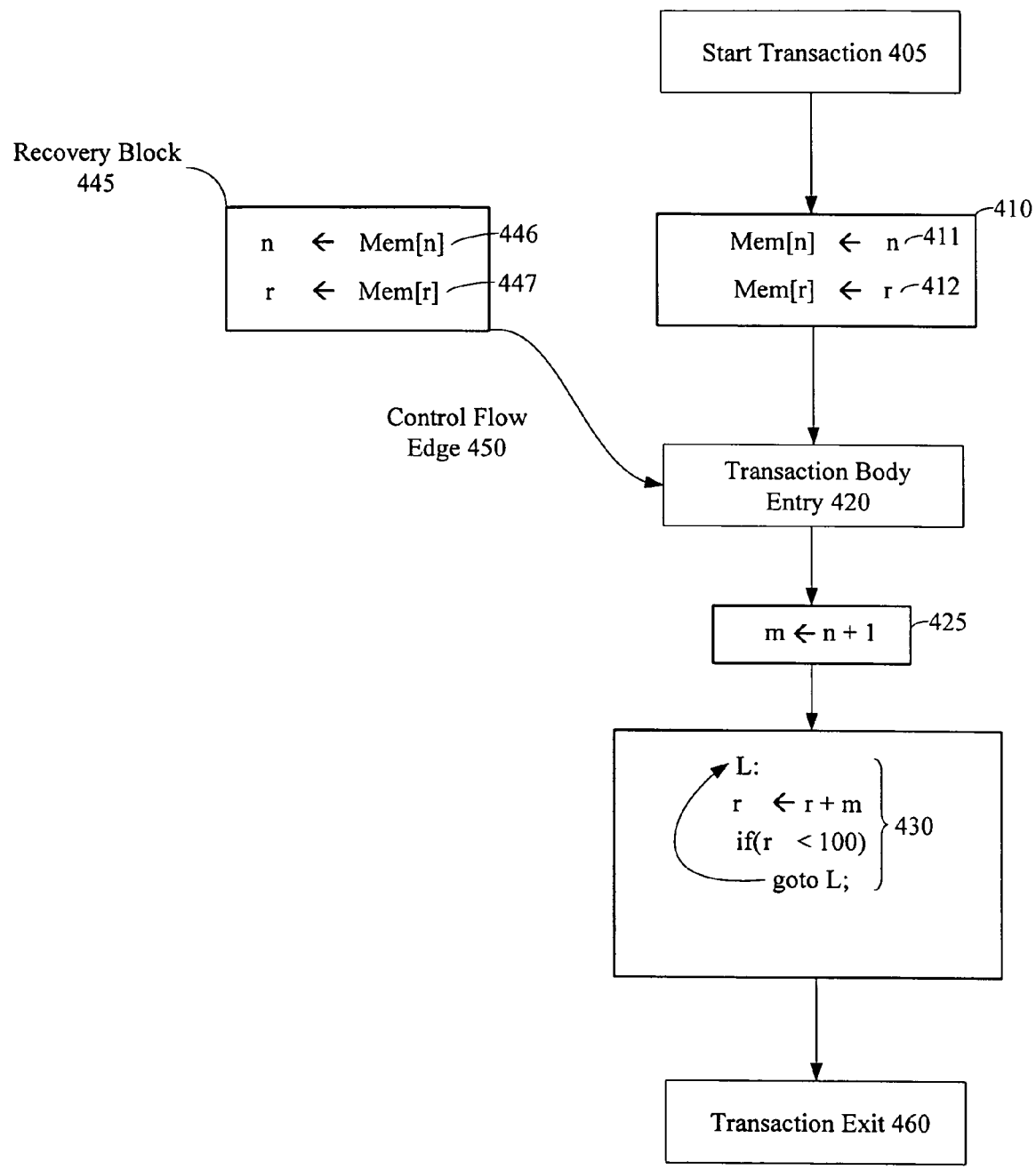
FIG. 4 illustrates another embodiment of a transaction region with inserted operations to perform efficient checkpointing.

Turning next to FIG. 4, another embodiment of a control flow diagram for a transaction region including efficient storage element checkpointing is illustrated. Similar to FIG. 3, a transaction is demarcated by start transaction point 405 and commit/transaction exit point 460. The transaction body still includes operations 425 and 430, as well as control flow edge 450.

However, in checkpoint block 410, storage elements n and r are backed up in memory locations Mem[n] and Mem[r]. As stated above, registers n and r may be backed up in any storage elements, such as any type of register or memory location. FIG. 3 depicted an illustrative embodiment of virtual back up registers, while FIG. 4 illustrates another embodiment of storage elements including memory locations. In one embodiment, memory locations Mem[n] and Mem[r] are locations in a program stack. Analogously, recovery block 445, including operations 446 and 447, include operations to restore storage elements n and r from program stack locations Mem[n] and Mem[r].

The illustrative embodiment depicted in FIG. 4, in one embodiment, is utilized when function calls exists in a transaction. As stated above in reference to FIG. 3, when inserting a roll-back edge, in one embodiment, the edge is inserted at every potential abort point including function calls. Here, no roll-back edge is illustrated in the control flow. Instead, a transaction runtime system ensures that the program control flow goes back to recover block 445 in response to an abort event.

Figure 5:
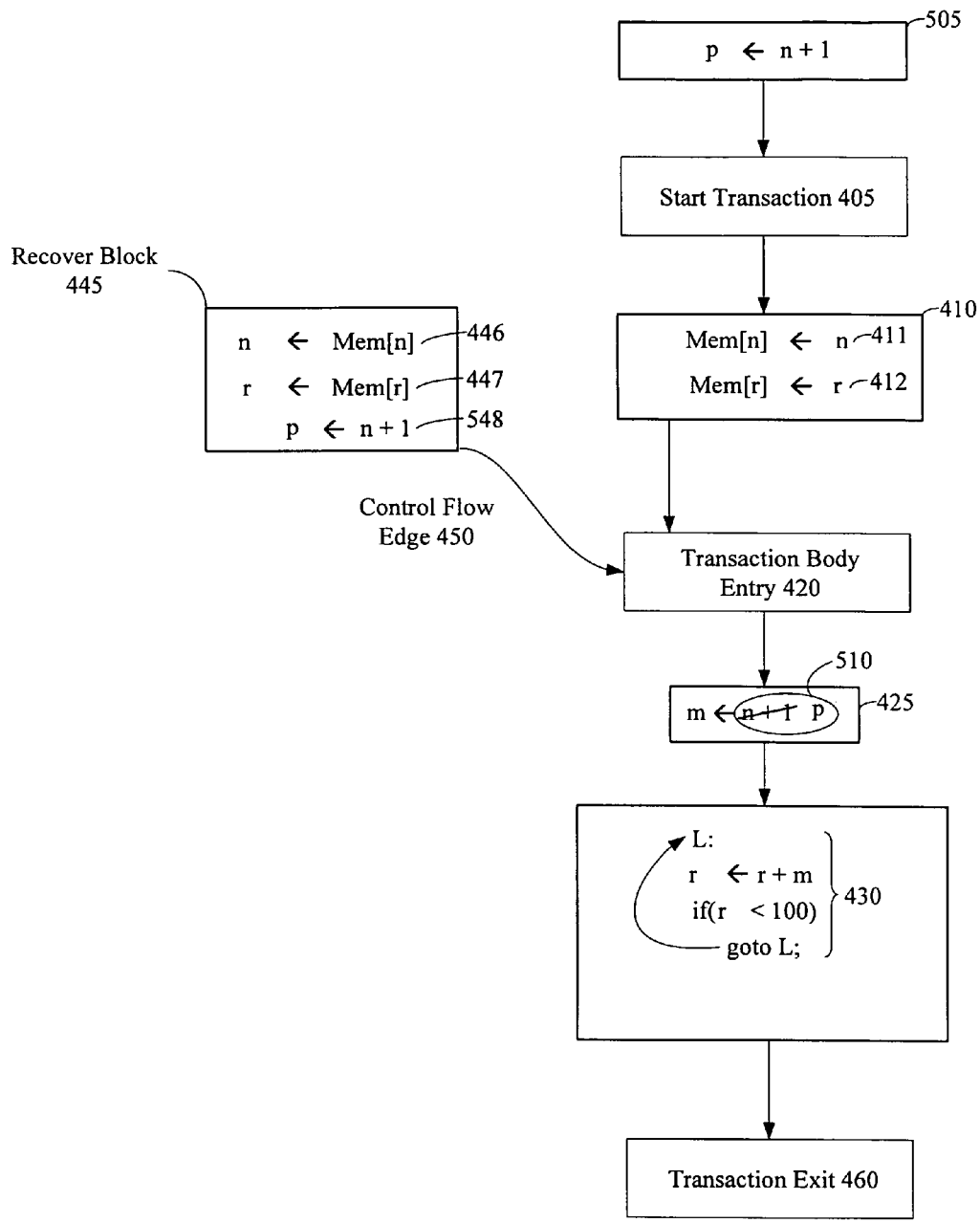
FIG. 5 illustrates an embodiment of FIG. 4 after compiler optimizations have been performed.

In another embodiment where compiler optimizations do not remove memory operations that appear to be dead after checkpointing operations are inserted, the roll-back edge to checkpointing operations 411 and 412 is kept from being optimized away Next in FIG. 5, an embodiment of the control flow illustrated in FIG. 4 with compiler optimizations is shown. In one embodiment, the efficient register checkpointing operations/instructions discussed above are inserted before compiler optimizations are performed. Examples of compiler optimization include trace based optimizations and partial redundancy elimination (PRE). An example of a trace based optimization was discussed above in reference to FIG. 3's roll-back edge. There, a compiler is biased against overwriting r_bkup and n_bkup due to the control trace including the recovery block, where r_bkup and n_bkup are used as inputs.

FIG. 5 illustrates an embodiment of PRE. After, checkpoint block 410 and recovery block 445 are inserted, a compiler performs a PRE optimization. Here, an operation, i.e. operation 505, which is outside the transaction region, adds 1 to storage element n and writes the result to storage element p. The same result in operation 425 is written to storage element m within the transaction region. Therefore, the result to be stored to m may be replaced by a reference 510 to the external storage element p. Essentially, n+1 is stored in p; therefore, p may be copied to m in operation 425 instead of performing n+1 a second time. The n+1 operation may be referred to as a live-in operation and p may be referred to as a live-in storage element.

In one embodiment, operation 548 is inserted into recovery block 445 to restore the original n+1 value in p before re-execution of the transaction body through control flow edge 450 to transaction body entry 420. Note that after compiler optimizations are performed, such as the ones shown, live-in registers and other operations may have updated since the insertion of checkpoint and recovery operations. As a result, more operations may be inserted, while previous inserted operations are removed. As an example, if storage element r is determined not to be modified inside the transaction, i.e. a live-in storage element, after a compiler optimization, operations 412 and 447 may be removed.

Figure 6:
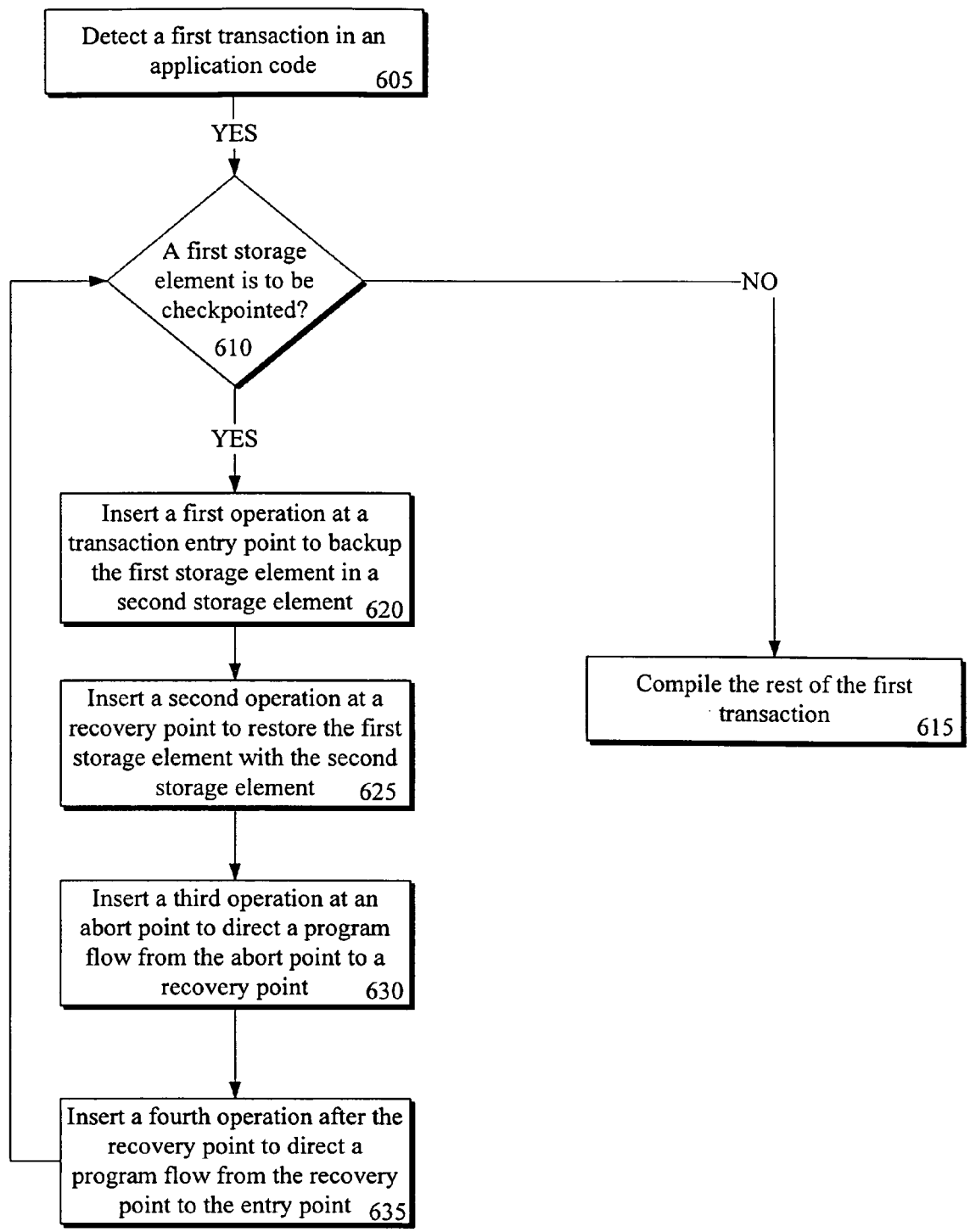
FIG. 6 illustrates an embodiment of a flow diagram for a method of inserting operations to perform efficient storage element checkpointing.

Referring to FIG. 6 an embodiment of a flow diagram for inserting operations/instructions to perform efficient storage element is illustrated. In one embodiment, code to perform the flow illustrated, is referred to as a compiler; however, any code, when executed, is to perform the flow illustrated may be used. In flow 605, a first transaction is detected in application code. In one embodiment, a start transaction instruction or other critical section defining instruction is detected in the application code.

Next, in flow 610 it is determined if a first storage element is to be checkpointed. Note that all storage elements to be checkpointed may be determined in flow 610, and corresponding instructions may be inserted in groups or blocks. Also, the operations inserted in the flow illustrated may be inserted in any order. For example, the fourth operation to direct program flow from the recovery point to the transaction entry point may be inserted before the third operation to direct a program flow from the abort point to the recovery point.

In one embodiment, storage elements to be modified in the first transaction are determined to be checkpointed. In another embodiment, all live-in storage elements are determined to be checkpointed. Alternatively, live-in storage elements to be modified in the first transaction are determined to be checkpointed. A storage element refers to any element capable of storing data and/or instructions associated with the first transaction, such as any type of register or memory location. If no storage elements are to be checkpointed, then the rest of the first transaction is compiled and optimized in flow 615.

However, if a first storage element is to be checkpointed, a first operation is inserted at a transaction entry point of the first transaction to backup the first storage element in a second storage element in flow 620. For example, a copy operation to copy the contents of a first live-in register to a second backup virtual register is inserted. In another embodiment, an operation to backup a register in a program stack location is inserted.

Next, in flow 625 a second operation is inserted at a recovery point to restore the first storage element with the second storage element. In one embodiment, a copy operation is inserted to copy the contents of the second backup storage element to the first storage element to restore the state of the first storage element. In addition, in flow 630 a third operation is inserted at an abort point to direct a program flow from the abort point to the recovery point. Here, the third operation provide a roll-back edge from a potential abort point to the recovery point to ensure the transaction is rolled-back properly to attempt re-execution.

In flow 635, a fourth operation is inserted after the recovery point to direct the program flow from the recovery point to the transaction entry point. The fourth operation forms a control flow edge to re-execute the transaction. In one embodiment, the control flow edge directs the program flow to the transaction entry point after the first operation, as the second storage element already includes the contents of the first storage element when the recovery point is reached.

Figure 7:
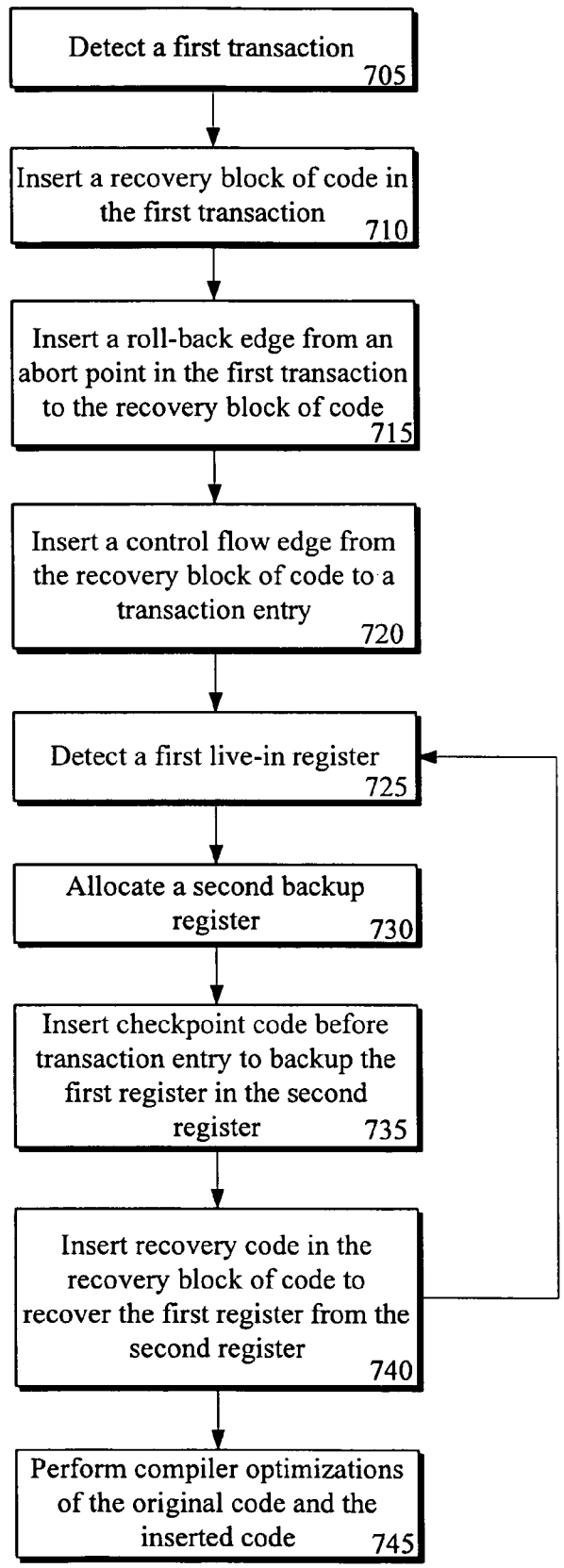
FIG. 7 illustrates another embodiment of a flow diagram for a method of inserting code to perform efficient register checkpointing.

Turning to FIG. 7 an embodiment of a flow diagram for inserting instructions/operations to perform efficient register checkpointing is illustrated. In flow 705 a first transaction is detected. In flow 710, a recovery block of code is inserted to perform transaction recovery operations. Next, a roll-back edge is inserted at an abort point in the first transaction to the recovery block of code in flow 715. In one embodiment, a roll-back edge is inserted at all potential abort points. In addition to a roll-back edge, a control flow edge is inserted from the recovery block of code to a transaction body entry point in flow 720.

In flow 725, a first live-in register is detected. Any know method of computing or detecting live-in values, operations, or registers may be used. A second backup register is allocated in flow 730, and checkpoint code is inserted before the transaction body entry to back the contents of the first live-in register to the second backup register in flow 735. Next, recovery code is inserted into the recovery block of code to recover the original contents of the first register from the second register in flow 740. In one embodiment, flows 725-740 are performed recursively until all live-in registers, all-modified registers, or all live-in modified registers, as designated by design implementation, are efficiently checkpointed. Finally, in flow 745 compiler optimizations of the original application/program code and the inserted code are performed.

Figure 8:
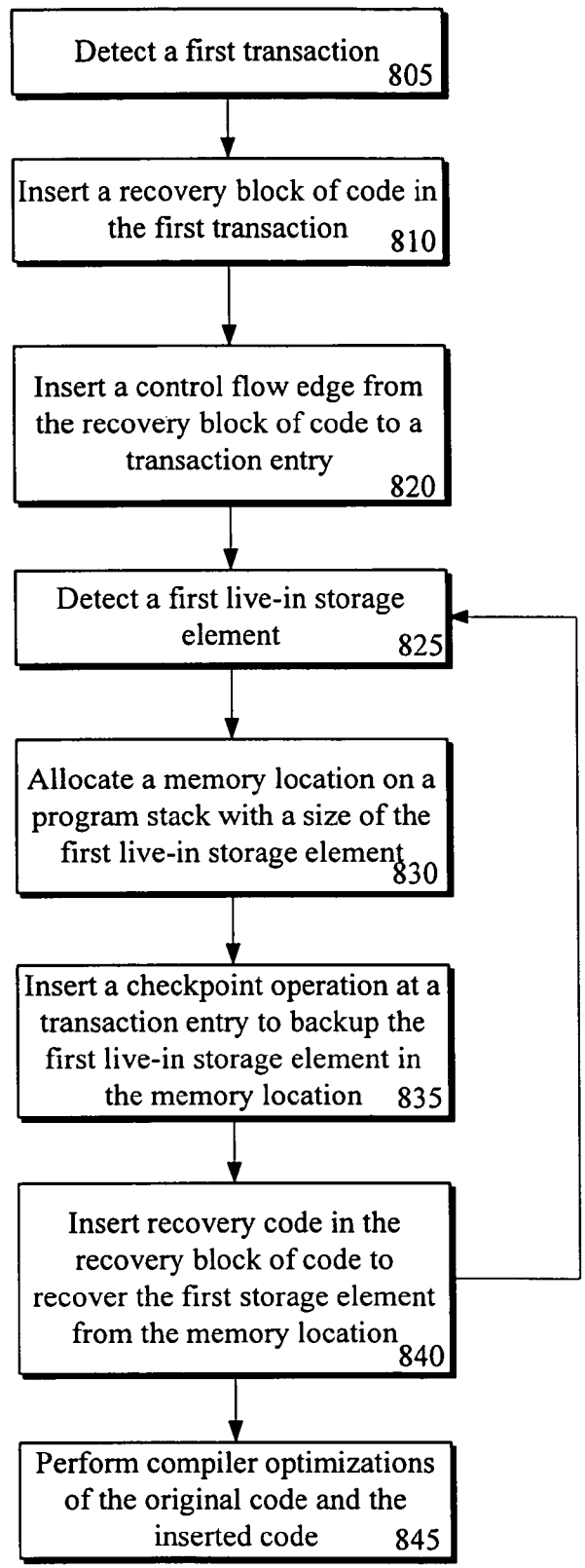
FIG. 8 illustrates an embodiment of a flow diagram for a method of inserting code to perform efficient storage element checkpointing utilizing a program stack.

FIG. 8 an embodiment of a flow diagram for inserting instructions/operations to perform efficient register checkpointing utilizing program stack locations is illustrated. Similar to FIG. 7, in flow 805, 810, and 820 a first transaction is detected, a recovery block of code is inserted, and a control flow edge is inserted from the recovery block to the transaction entry point. However, a roll-back edge, as in flow 715, is not inserted, as a runtime system is relied upon to return execution to the recovery block in response to an abort and the compiler compiler optimization will not optimize the memory operations away.

In flow 825 a first live in storage element, such as a register, is detected. However, in flows 830-840, a memory location in a program stack with a size of the first live-in storage element is allocated, a checkpoint operation at a transaction entry is inserted to backup the first live-in register in the memory location, and recovery code is inserted into the recovery block of code to recover the first storage element from the memory location. As above, flows 825-840 may be recursively performed until instructions/operations/edges associated with the storage elements to be checkpointed are inserted. Then, in flow 845, compiler optimizations, such as trace based optimizations and partial redundancy elimination (PRE), are performed on the original and inserted code.

As illustrated above, storage elements referenced in program code may be efficiently checkpointed through compiler inserted operations/instructions and edges. Live-in registers are backed up with checkpoint code to backup storage element, while recovery of the live-in registers is performed in inserted recovery code. In one implementation, a roll-back edge from potential abort points to the recovery code is inserted, which enables the compiler to preserve the backup storage elements from modification during execution of the transaction. In addition, when function calls are detected in the transaction, the live-in registers may be backed up in program stack locations.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
   detecting a first transaction;
   determining a first storage element associated with the first transaction to be checkpointed by (i) determining the first storage element is a live-in storage element associated with the first transaction and (ii) determining the first storage element is to be checkpointed in response to determining the first storage element is a live-in storage element;
   inserting a first operation to store an original value to be held in the first storage element to a second storage element;
   inserting a second operation to restore the original value from the second storage element to the first storage element in response to an abort event in the first transaction
   determining a live-in operation is to be performed before the first transaction, wherein the result of the live-in operation is to be held in the first live-in storage element;
   determining the live-in operation is also to be performed in the first transaction and the result of the live-in operation is to be held in a third storage element; and
   replacing the live-in operation in the first transaction with a third operation to copy the result of the live-in operation to be held in the first live-in storage element to the third storage element in response to determining the live-in operation is to be performed before the first transaction, the live-in operation is also to be performed in the first transaction, and the result of the live-in operation is to be held in a third storage element.

2. The method of claim 1, further comprising inserting a third operation at an abort point in the first transaction to direct a program flow from the abort point to the second operation in response to the abort event.

3. The method of claim 2, further comprising inserting a fourth operation after the third operation to direct the program flow to a critical section entry point in the first transaction.

4. The method of claim 1, further comprising:
inserting a recovery block of code including the second operation, wherein the recovery block of code is to also include the live-in operation to store the live-in result in the first storage element;
inserting a third operation at an abort point to direct a program flow from the abort point to the recovery block in response to the abort event, which is associated with the abort point; and
inserting a fourth operation to direct the program flow from the recovery block of code to a critical section entry point in the first transaction.

5. The method of claim 1, wherein the first and the second storage elements are each selected from a group consisting of a register, a memory location, and a memory location in a program stack associated with the first transaction.

6. The method of claim 1, wherein detecting a first transaction includes encountering a start transaction instruction and an end transaction instruction to demarcate the first transaction.

7. A tangible, computer-readable medium including program code which, when executed by a machine, causes the machine to perform the operations of:
detecting a first transaction;
inserting a first operation at a transaction entry point in the first transaction, the first operation to copy an original value to be stored in a first storage element associated with the first transaction to a second storage element;
inserting a second operation at a recover point in the first transaction, the second operation to copy the original value from the second storage element to the first storage element;
inserting a third operation to direct a program flow to the transaction entry point after execution of the second operation;
replacing a fourth operation in the first transaction with a reference to the first storage element in response to a result of the fourth operation being stored in the first storage element immediately before the first transaction; and
inserting a fifth operation at the recover point to store the result of the fourth operation in the first storage element.

8. The tangible, computer-readable medium of claim 7, wherein the first storage element is a first register and the second storage element is a second register.

9. The tangible, computer-readable medium of claim 8, further comprising inserting a function call to the recover point at an abort point in the first transaction.

10. The tangible, computer-readable medium of claim 9, wherein first and second registers are each selected from a group consisting of a hardware register, an abstract register, and a virtual register.

11. The tangible, computer-readable medium of claim 7, wherein the first storage element is a first register and the second storage element is a program stack memory location.

12. A system comprising:
a memory device to store compiler code and program code; and
a processor associated with the memory device to execute the compiler code,
wherein the compiler code, when executed, causes the processor to:
detect a first transaction;
insert a first operation at a transaction entry point in the first transaction, the first operation to copy an original value to be stored in a first storage element associated with the first transaction to a second storage element;
insert a second operation at a recover point in the first transaction, the second operation to copy the original value from the second storage element to the first storage element;
insert a third operation to direct a program flow to the transaction entry point after execution of the second operation;
replace a fourth operation in the first transaction with a reference to the first storage element in response to a result of the fourth operation being stored in the first storage element immediately before the first transaction; and
insert a fifth operation at the recover point to store the result of the fourth operation in the first storage element.

13. The system of claim 12, wherein the memory device is selected from a group consisting of a cache memory in the processor, a cache memory coupled to the processor, a shared memory coupled to the processor, and a system memory coupled to the processor.

14. The system of claim 12, wherein the first storage element is a first register and the second storage element is a second register.

15. The system of claim 12, wherein the plurality of instructions further cause the processor to insert a function call to the recover point at an abort point in the first transaction.

16. The system of claim 12, wherein first and second registers are each selected from a group consisting of a hardware register, an abstract register, and a virtual register.

17. The system of claim 12, wherein the first storage element is a first register and the second storage element is a program stack memory location.

* * * * *